US008462007B2

(12) United States Patent
Fujieda

(10) Patent No.: US 8,462,007 B2
(45) Date of Patent: Jun. 11, 2013

(54) MONITORING DEVICE, INFORMATION PROCESSING APPARATUS, AND ALARM SIGNAL OUTPUT METHOD HAVING AN ALARM STORAGE UNIT FOR STORING ALARM SIGNALS FOR ITSELF AND OTHER UNITS

(75) Inventor: Daishi Fujieda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 881 days.

(21) Appl. No.: 12/616,939

(22) Filed: Nov. 12, 2009

(65) Prior Publication Data

US 2010/0052932 A1 Mar. 4, 2010

Related U.S. Application Data

(63) Continuation of application No. PCT/JP2007/061368, filed on Jun. 5, 2007.

(51) Int. Cl.
  *G08B 21/00* (2006.01)
(52) U.S. Cl.
  USPC ............................ 340/679; 340/540; 340/635
(58) Field of Classification Search
  USPC ............... 340/539.1, 506, 508, 635, 540, 679
  See application file for complete search history.

(56) References Cited

U.S. PATENT DOCUMENTS 5,587,705 A * 12/1996 Morris .......................... 340/628

FOREIGN PATENT DOCUMENTS

| JP | 58-41535 | 9/1983 |
| JP | 3-007439 | 1/1991 |
| JP | 7-281918 | 10/1995 |
| JP | 9-259008 | 10/1997 |

OTHER PUBLICATIONS

International Search Report dated Sep. 11, 2007, from the corresponding International Application.

* cited by examiner

*Primary Examiner* — Jeffery Hofsass
(74) *Attorney, Agent, or Firm* — Katten Muchin Rosenman LLP

(57) ABSTRACT

A monitoring device configured to be installed in an information processing apparatus to detect a failure of the information processing apparatus, and to output an alarm signal when the failure is detected, the monitoring device including an alarm signal generating unit that generates the alarm signal upon detecting the failure, an alarm signal storing unit that stores the generated alarm signal, an alarm signal output unit that outputs the stored alarm signal to outside, an alarm signal input unit that receives, when the monitoring device is in a standby state, another alarm signal from another monitoring device in an active state, and an alarm signal storage instructing unit that supplies to the alarm signal storing unit an instruction signal for storing said another alarm signal in the alarm signal storing unit.

10 Claims, 18 Drawing Sheets

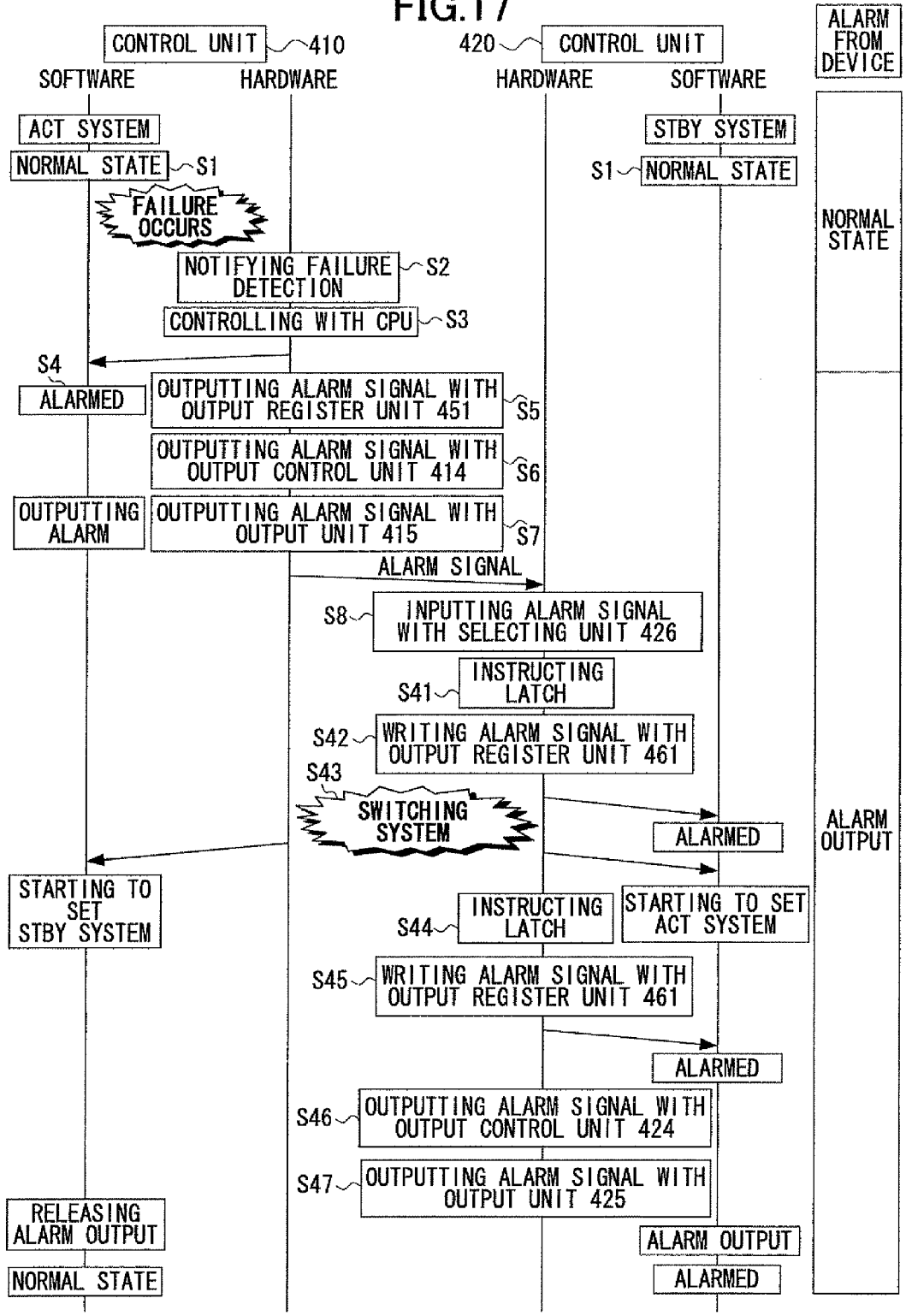

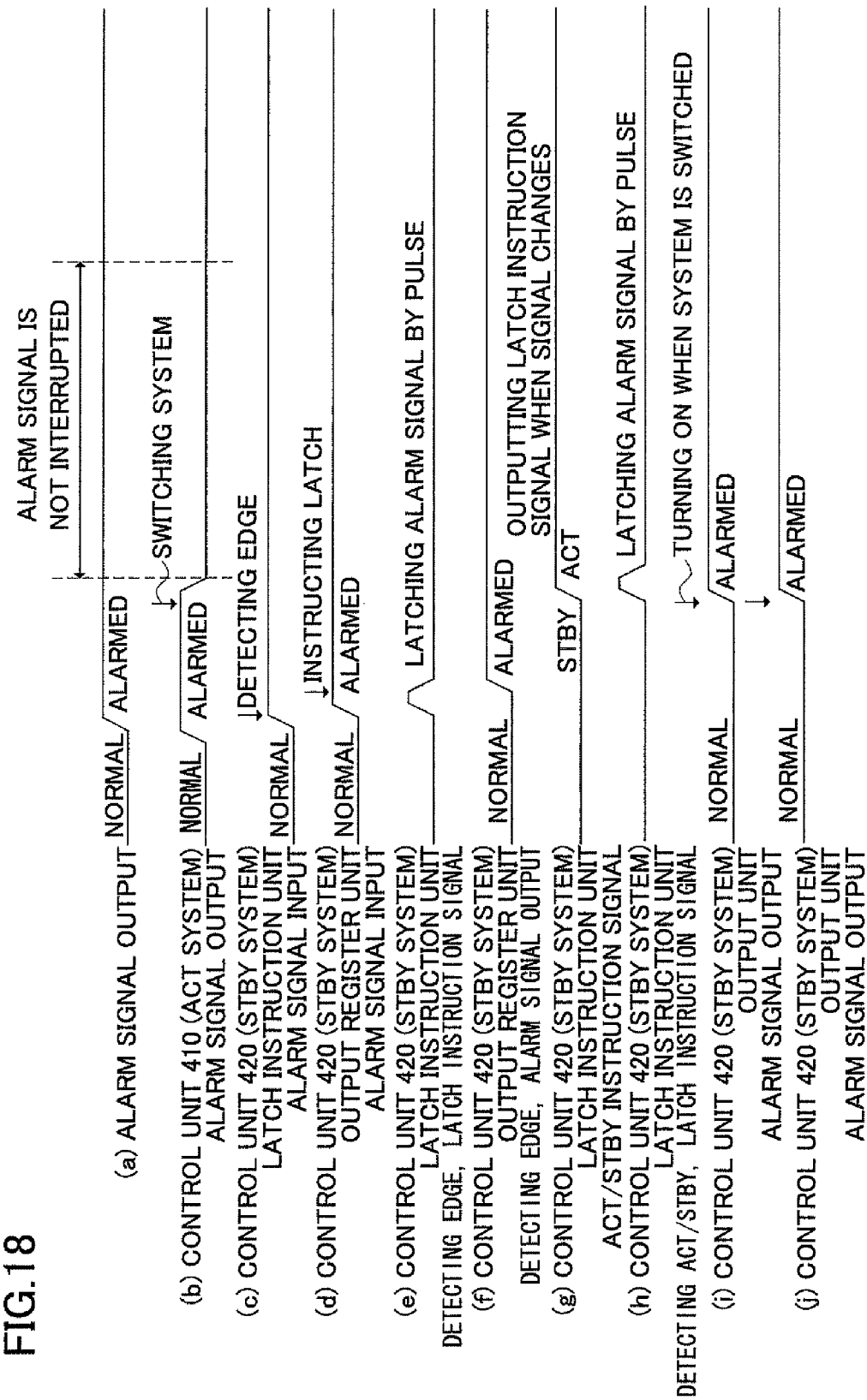

MONITORING DEVICE, INFORMATION PROCESSING APPARATUS, AND ALARM SIGNAL OUTPUT METHOD HAVING AN ALARM STORAGE UNIT FOR STORING ALARM SIGNALS FOR ITSELF AND OTHER UNITS

CROSS-REFERENCE TO RELATED APPLICATIONS

This patent application is based upon and claims the benefit of the prior International Patent Application No. PCT/JP2007/061368 filed on Jun. 5, 2007, the entire contents of which are incorporated herein by reference.

FIELD

The embodiments discussed herein are related to a monitoring device installed in an information processing device.

BACKGROUND

A communication device such as a transmission device is generally provided with a monitoring device configured to detect a failure occurring inside the communication device and to output an alarm signal to the outside. Such a failure monitoring and outputting function by the monitoring device is generally called a housekeeping function or an office alarm function. Patent Document 1 discloses a monitoring method that automatically switches from a current digital communication line to a backup digital communication line upon receipt of an alarm indicative of communication line deterioration.

[Patent Document 1] Japanese Laid-open Patent Publication No. 03-007439.

SUMMARY

According to an aspect of the invention, a monitoring device configured to be installed in an information processing apparatus to detect a failure of the information processing apparatus, and to output an alarm signal when the failure is detected, the monitoring device including an alarm signal generating unit that generates the alarm signal upon detecting the failure, an alarm signal storing unit that stores the generated alarm signal, an alarm signal output unit that outputs the stored alarm signal to outside, an alarm signal input unit that receives, when the monitoring device is in a standby state, another alarm signal from another monitoring device in an active state, and an alarm signal storage instructing unit that supplies to the alarm signal storing unit an instruction signal for storing said another alarm signal in the alarm signal storing unit.

The object and advantages of the invention will be realized and attained by means of the elements and combinations particularly pointed out in the appended claims. It is to be understood that both the foregoing general description and the following detailed description are exemplary and explanatory and are not restrictive of the invention, as claimed. Additional objects and advantages of the embodiments will be set forth in part in the description which follows, and in part will be obvious from the description, or may be learned by practice of the invention.

BRIEF DESCRIPTION OF THE DRAWINGS

FIG. 17 is a sequence chart illustrating alarm output operations from control units at a time of switching between the ACT system and the STBY system; and FIG. 18 is a timing chart of alarm signal outputs in Embodiment 4.

DESCRIPTION OF EMBODIMENTS

The embodiments discussed herein are related to a monitoring device which is installed in an information processing device such as a transmission device and outputs an alarm signal when a failure of the information processing device is detected.

Figure 1:
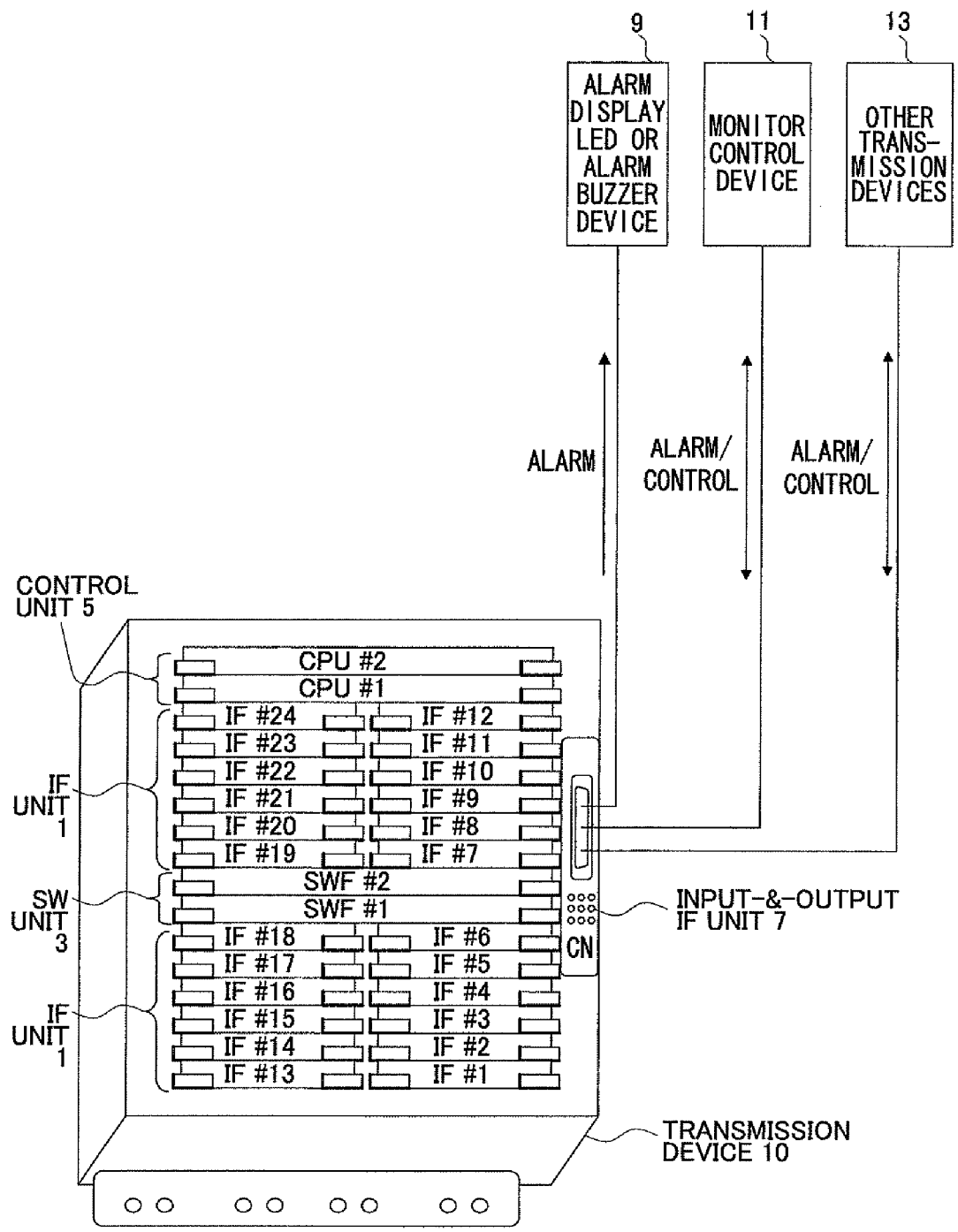
FIG. 1 schematically illustrates an example of a transmission device provided with such a monitoring device and devices connected to the monitoring device.

FIG. 1 schematically illustrates an example of a transmission device 10 provided with such a monitoring device and devices connected to the monitoring device. As illustrated in FIG. 1, the transmission device 10 includes interface units (IF units) 1, a switch unit (SW unit) 3 and a control unit 5. The interface units 1, the switch unit 3 and the control unit 5 may be independently provided as packages. The control unit 5 corresponds to the above-mentioned monitoring device. Further, the transmission device 10 includes an input-&-output interface unit 7 (see FIG. 2) as an interface unit for inputting and outputting an alarm signal and a control signal.

Referring to FIG. 1, the SW unit 3 and the control unit 5 respectively have dual configurations (e.g. fault tolerant system) comprised of a standby system and an active system. The control unit 5 is provided with a control function for setting various parts of the transmission device 10 in addition to a failure monitoring function for outputting an alarm signal, for example. Further, the control unit 5 is connected to an alarm display LED or alarm buzzer 9, a monitor control device 11 which carries out an operation, and other transmission devices 13. The transmission device 10 may be connected to all of the alarm display LED or alarm buzzer 9, the monitor control device 11, and the other transmission devices 13, or to part of the LED or alarm buzzer 9, the monitor control device 11, and the other transmission devices 13.

Figure 2:
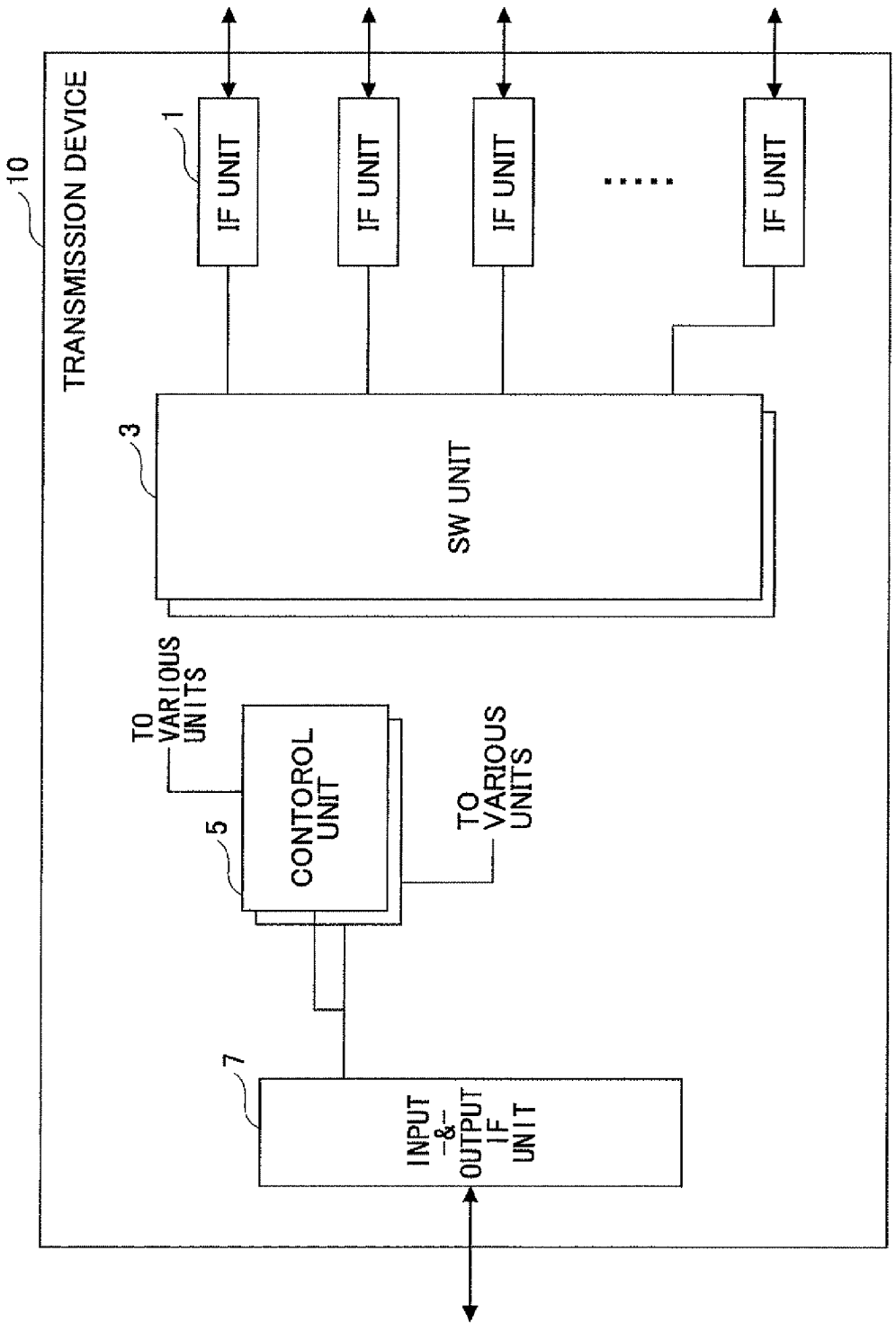
FIG. 2 illustrates an internal structure of the transmission device illustrated in FIG. 1.

FIG. 2 illustrates an internal structure of the transmission device 10 illustrated in FIG. 1. The interface units (IF unit) 1, the switch unit (SW unit) 3, the control unit 5, and the input-&-output interface unit 7 are connected to one another as illustrated in FIG. 2. Ordinarily, a main signal from the transmission device 10 is input into one of the interface units (IF unit) 1, and output from another one of the interface units (IF unit) 1 via the switch unit (SW unit) 3. The control unit 5 is connected to various portions forming the transmission device 10, and may detect failure occurring in any one of the portions forming the transmission device 10 when the failure occurs.

Figure 3:
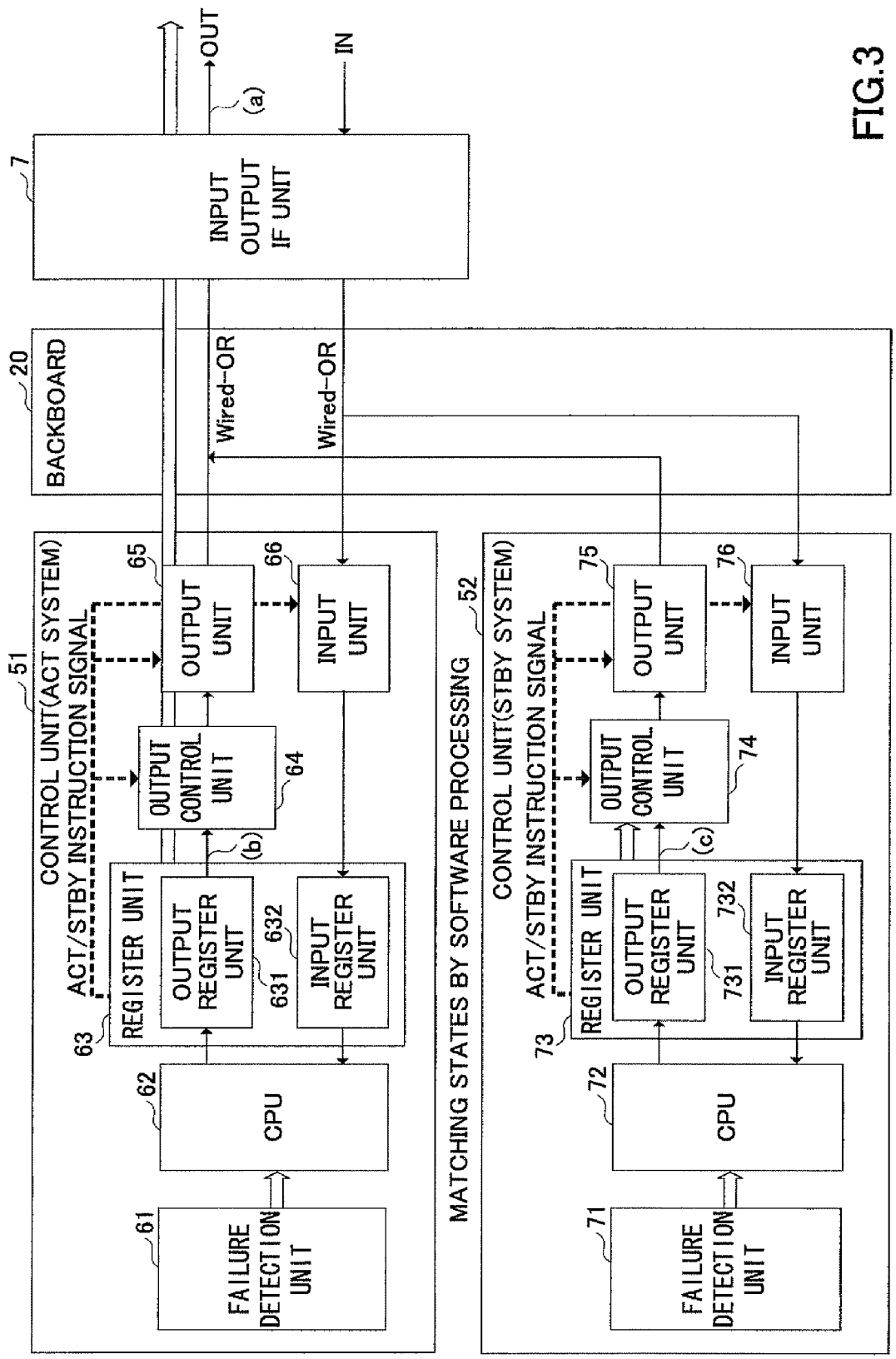
FIG. 3 illustrates a structure of a control unit in the transmission device illustrated in FIG. 2.

FIG. 3 illustrates a structure of the control unit 5. Referring to FIG. 3, two control units 51, 52 are connected by a wired-OR circuit on a backboard of the transmission device 10. Further, the control units 51, 52 are connected to the input-&-output interface unit 7 through the backboard 20. In the example illustrated in FIG. 3, the control unit 51 is serving as an active system, and the control unit 52 is serving as a standby system. In the following, the term "ACT (ACTive) system" and the term "STBY (STandBY) system" will be used to refer to the active system and the standby system, respectively, as normally used in the pertinent art. The ACT system is a system in an active state, and the STBY system is a system in a standby state.

The control unit 51 includes a failure detection unit 61, a CPU 62, a register unit 63, an output control unit 64, an output unit 65, and an input unit 66. The failure detection unit 61, the CPU 62, the register unit 63, the output control unit 64, the output unit 65, and the input unit 66 are hardware. The failure detection unit 61 detects failure inside the transmission device 10. Through software-based control, the CPU 62 has at least a function of generating an alarm signal upon receipt of the failure detection signal from the failure detection unit 61 and a function of controlling operations based on a control signal from the outside.

The register unit 63 is made of, for example, a Complex Programmable Logic Device (CPLD), and includes an output register unit 631 and an input register unit 632. The output control unit 64 is made up of a buffer. When the control unit 51 is the ACT system, the output control unit 64 is turned on and outputs an alarm signal. When the control unit 51 is the STBY system, the output control unit 64 is turned off and does not output the alarm signal. The output unit 65 is made up of a ground air circuit such as a relay. When the control unit 51 is the ACT system, the output unit 65 is turned on and outputs an alarm signal. When the control unit 51 is the STBY system, the output unit 65 is turned off and does not output the alarm signal. The input unit 66 is made up of a ground air circuit such as a relay. When the control unit 51 is the ACT system, the input control unit 66 is turned on and receives a control signal or the like from the outside. When the control unit 51 is the STBY system, the input unit 66 is turned off and does not receive the signals.

The control unit 51 of the ACT system is connected to the control unit 52 of the STBY system by a wired-OR circuit on the backboard 20. The backboard 20 functions to provide a signal input from the input-&-output interface unit 7 to the control unit 51 of the ACT system and the control unit 52 of the STBY system, and to output data from the control unit 51 of the ACT system or output data from the control unit 52 of the STBY system to the input-&-output interface unit 7. The control unit 52 has a structure similar to that of the control unit 51.

Referring to FIG. 3, when the failure detection unit 61 detects a failure of the transmission device 10, an alarm signal is generated by the CPU 62 and is output to the outside via the output register unit 631, the output control unit 64, and the output unit 65. Further, when a control signal or the like is input, the input unit 66 of the control unit 51 of the ACT system receives the control signal, the control signal is sent to the CPU 62 via the input register unit 632, and the CPU 62 carries out an operation corresponding to the control signal.

Further, when the control unit 51 of the ACT system detects failure of the control unit 51 itself, the failure is reported to the control unit 52 of the STBY system, and the STBY system is switched to the ACT system. Meanwhile, the control unit 51 of the ACT system is switched to the STBY system. The switching between the ACT system and the STBY system may alternatively be carried out in response to instruction from the outside. Next, operations of the switching will be explained. The explanation is given on the premise that the control unit 51 of the ACT system is outputting the alarm signal when the ACT system is switched to the STBY system.

The control unit 52 of the STBY system receives an ACT/STBY instruction signal (hereinafter, referred to as a system switching control signal) indicating to switch to the ACT system. In response, the control unit 52 activates software in the CPU 72. The control unit 52 is switched to the ACT system as a result of the activation of the software. The control unit 52 then uses information passed over from the control unit 51 of the ACT system to carry out an internal setup. Thereafter, the control unit 52 carries out a setup for outputting the alarm signal to continue the outputting of the alarm signal originally output by the previous ACT system.

Figure 4:
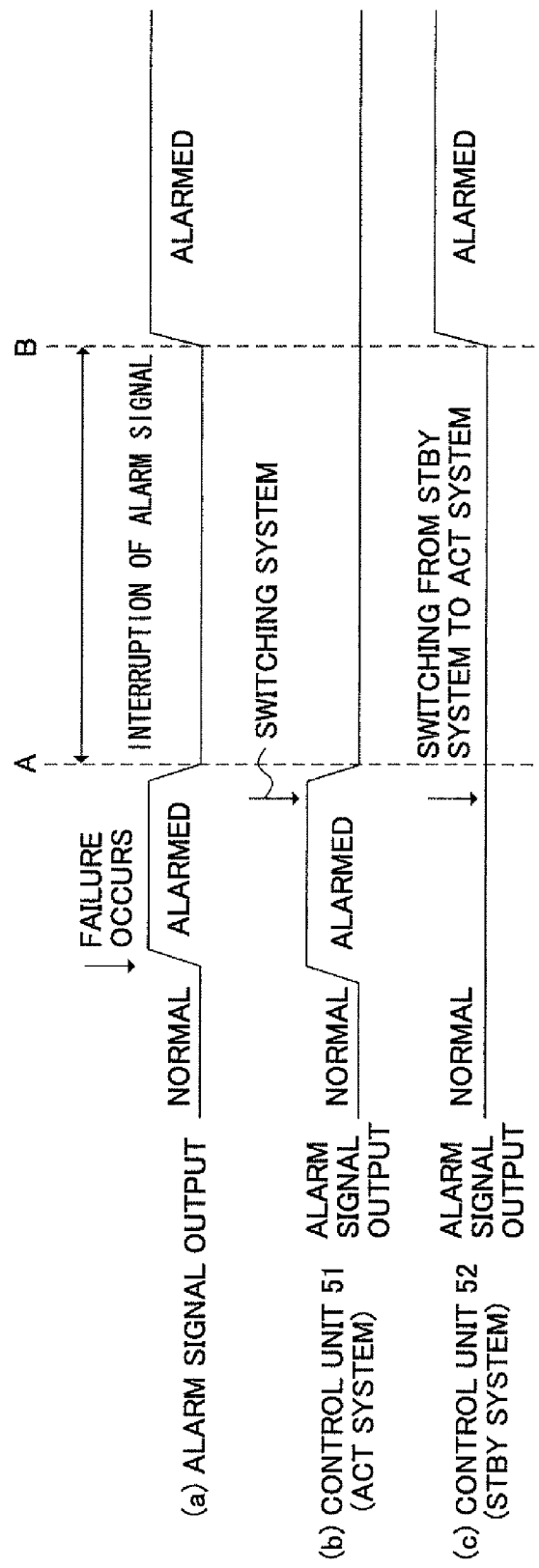
FIG. 4 illustrates a timing chart of alarm signal outputs relative to an ACT system and a STBY system.

FIG. 4 illustrates a timing chart of alarm signal outputs in the above-mentioned switching. Referring to FIG. 4, (b) designates the alarm signal output from the control unit 51 of the ACT system illustrated in FIG. 3, and (c) designates the alarm signal output from the control unit 52 of the STBY system illustrated in FIG. 3. As in (b) of FIG. 4, an event leading to switching from the ACT system to the STBY system occurs while the control unit 51 of the ACT system is outputting the alarm signal upon detecting a failure in the transmission device 10. In response, the system switching control signal is provided to the control unit 52, and the alarm signal ends up not being output from the control unit 51. As in (c) of FIG. 4, the control unit 52 activates software and outputs the alarm signal after the control unit 52 is in an active state operable as the ACT system. Thus, the alarm signal is interrupted in a time interval between A and B. From the viewpoint of system monitoring, it is not preferable to interrupt the alarm signal due to the switching between the ACT system and the STBY system.

To solve this problem, the control unit 52 may be placed in a hot standby state, and alarmed statuses of the ACT system and the STBY system may be constantly matched. However, in order to realize the hot standby state, the control unit 52 of the STBY system is required to carry out processes the same as those carried out in the control unit 51 of the ACT system, and the data are required to be matched at every change of information.

In the following, preferred embodiments of the present invention will be described with reference to the accompanying drawings.

In the embodiments, a control unit as an example of a monitoring device is installed in a transmission device as illustrated in FIGS. 1 and 2.

Embodiment 1

Figure 5:
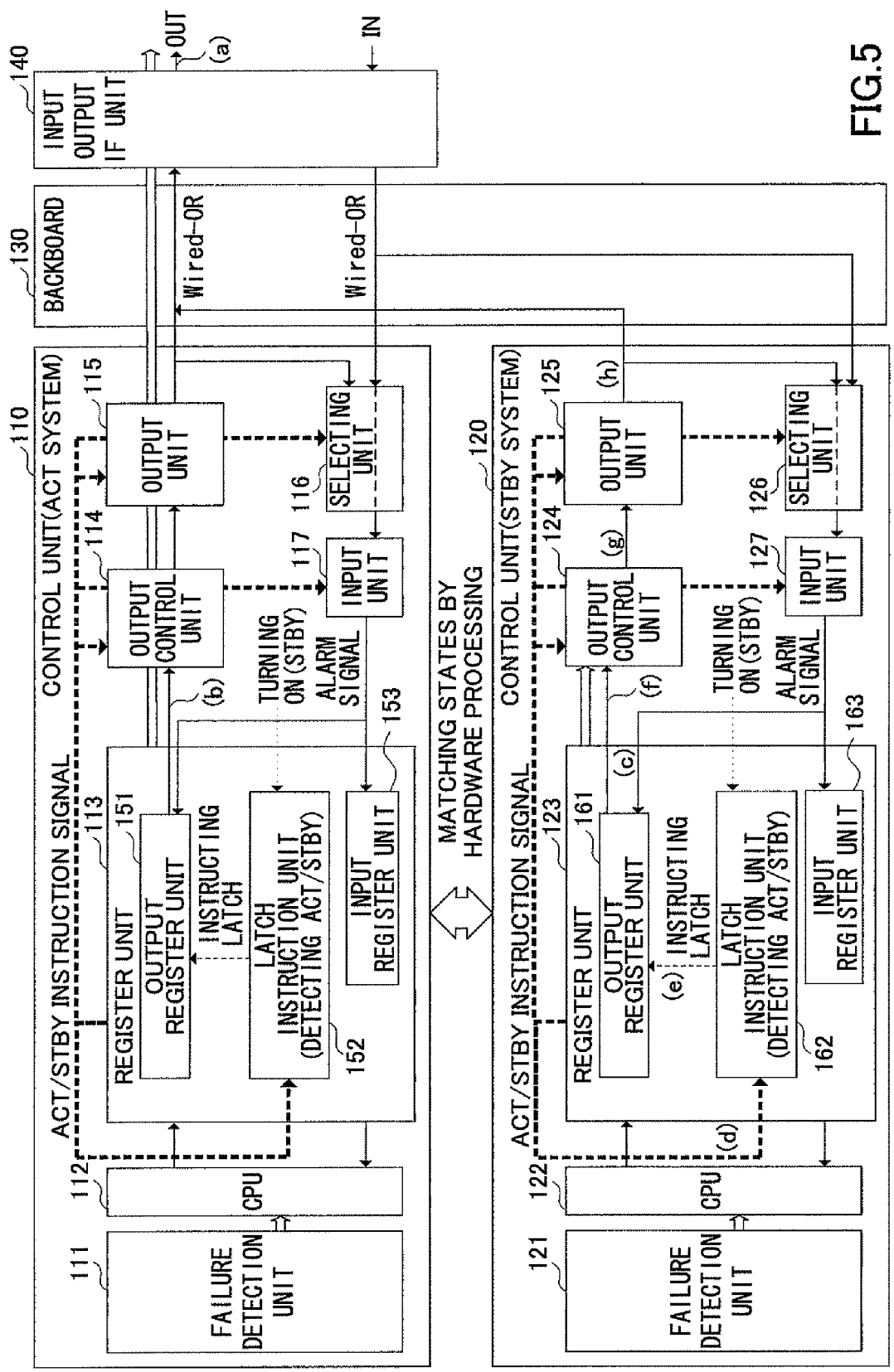
FIG. 5 illustrates a structure of control units of Embodiment 1.

FIG. 5 illustrates a structure of control units 110 and 120 of Embodiment 1. In FIG. 5, the control unit 110 is an ACT system and the control unit 120 is a STBY system. In Embodiment 1, an alarm signal output from the control unit 110 of the ACT system is input to the control system 120 of the STBY system via a backboard 130. Further, broken lines in FIG. 5 designate system switching control signals like an ACT/STBY instruction signal.

The structure of the control unit 110 is the same as the structure of the control unit 120. Differences of the structure of the control unit 120 from a background technique will mainly be described. The control unit 110 includes a failure detection unit 111, a CPU 112, a register unit 113, an output control unit 114, an output unit 115, an input unit 117, and a selecting unit 116. The failure detection unit 111, the CPU 112, the output control unit 114, the output unit 115 and the input unit 117 are hardware and may be the same as those used in the background technique. The control unit 120 includes a failure detection unit 121, a CPU 122, a register unit 123, an output control unit 124, an output unit 125, an input unit 127, and a selecting unit 126. The failure detection unit 121, the CPU 122, the output control unit 124, the output unit 125 and the input unit 127 are hardware and may be the same as those used in the background technique.

The alarm signal output from the control unit 110 is input in the control unit 120 of the STBY system via the backboard 130, branches inside the control unit 120 of the STBY system, and is input in the selecting unit 126 of the STBY system. When the control unit 120 is in the STBY-system state, the selecting unit 126 has a function of selecting and receiving the alarm signal output from the ACT system and input in the STBY system, and outputting the input alarm signal to the input unit 127. The input unit 127 is connected to an output register unit 161 and an input register unit 163.

The selecting unit 126 selects a signal input from the outside via an input output interface unit 140 and supplies the selected signal to the input unit 127 when the selecting unit 126 is the ACT system. The selecting unit 126 may be a relay circuit, and the input unit 127 may be a ground air circuit using, for example, a photo coupler.

Referring to FIG. 5, the register unit 123 of the control unit 120 is realized by a complex programmable logic device (CPLD), for example, and includes the output register unit 161, the input register unit 163, and a latch instruction unit 162. The latch instruction unit 162 is turned on in case of a STBY state and turned off in case of an ACT state. The latch instruction unit 162 has a latch instructing function of instructing the output register unit 161 to load the alarm signal supplied via the selecting unit 126 and the input unit 127 upon detection of the system switching control signal from the STBY state to the ACT state.

Referring to a sequence chart of FIG. 6, a description will be given of an alarm output operation of the control units 110 and 120 in a case where the ACT system and the STBY system are switched over.

Figure 6:
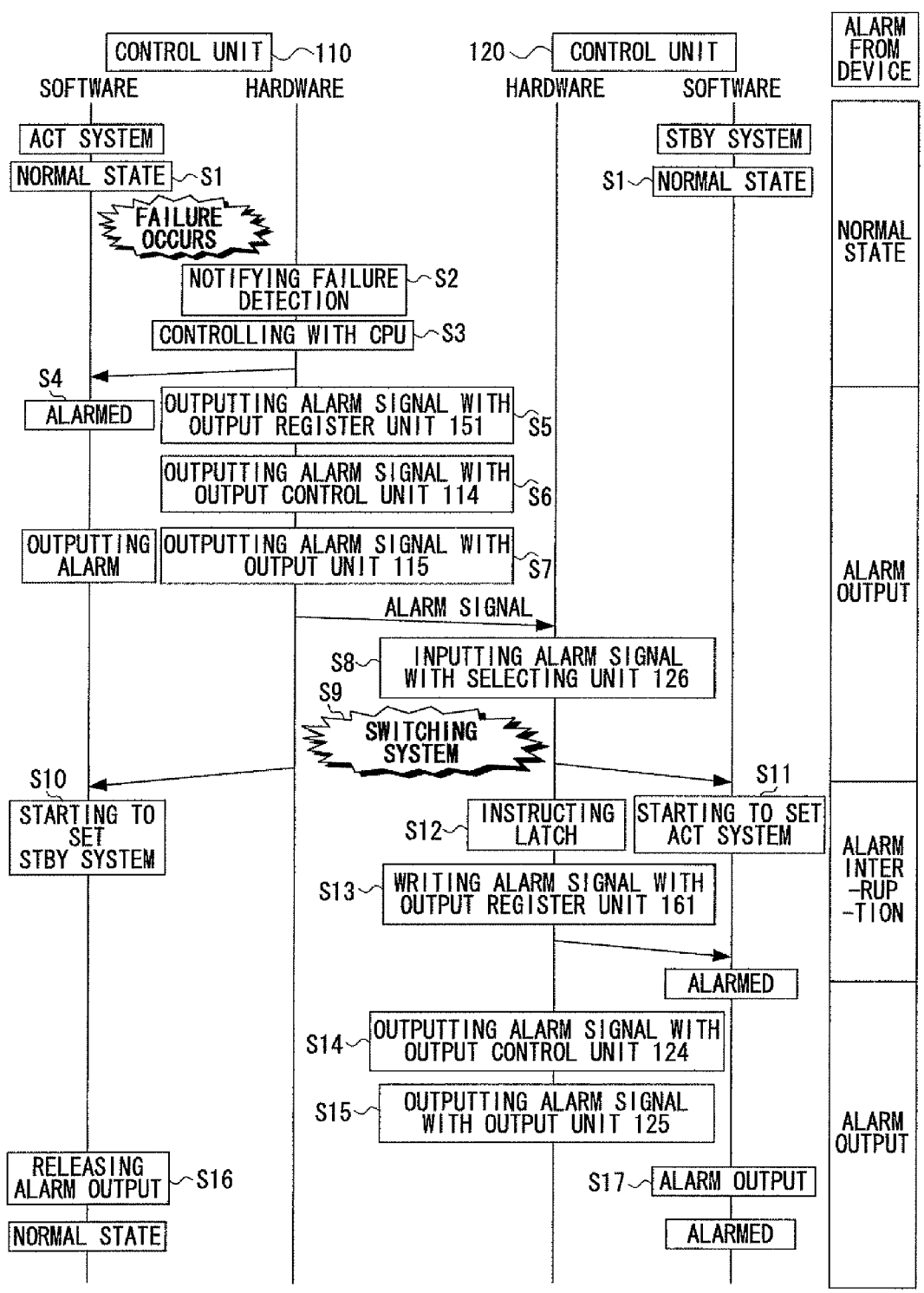
FIG. 6 is a sequence chart illustrating alarm output operations from control units.

FIG. 6 illustrates operations of hardware and software of the control units 110 and 120. In the following description, an operation mainly carried out by the software is an operation realized by a program executed in the CPU.

In step S1, the control unit 110 is the ACT system, the control unit 120 is the STBY system, software of the ACT system carries out a routine operation corresponding to the ACT system, and software of the STBY system carries out a routine operation corresponding to the STBY system. When a failure occurs at any portion of the transmission device, the failure detection unit 111 of the control unit 110 detects the failure and reports it to the CPU 112 in steps S2 and S3. Thereafter, the software is enabled to output the alarm signal (hereinafter, referred to as alarmed status) in steps S3 and S4.

The CPU 112 writes the alarm signal in the output register unit 151, and the alarm signal is sent from an output register unit 151 to the output control unit 114 in step S5. The alarm signal is written in the output control unit 114, and the alarm signal is sent to the output unit 115 in step S6. The alarm signal is output from the output unit 115 to the outside via the backboard 130 and the input-&-output interface unit 140 in step S7.

The alarm signal output from the control unit 110 of the ACT system is output to the outside, and, at the same time, is input to the control unit 120 of the STBY system via the backboard 130. The input alarm signal reaches the output register unit 161 via the selecting unit 126 and the input unit 127 in step S8.

When there occurs an event leading to switching the system due to the failure detected in step S2 or other troubles from the above-mentioned condition in step S9, a control signal instructing to switch from the ACT system to the STBY system is sent to the relevant portions of the ACT system, and a control signal instructing to switch from the STBY system to the ACT system is sent to the relevant portions of the STBY system. These control signals are sent from, for example, the CPU 112 of the ACT system. These control signals may alternatively be received from the outside.

Upon receipt of the control signal for switching the system (hereinafter, referred to as a switching system control signal), the software of the control unit 110 starts a setup for changing the control unit 110 from the ACT system to the STBY system, and the software of the control unit 120 starts a setup for changing the control unit 120 from the STBY system to the ACT system in steps S10 and S11.

In response to receipt of the switching system control signal, the latch instruction unit 162 of the control unit 120 instructs the output register unit 161 to latch the alarm signal in step S12. When the alarm signal is stored in the output register unit 161 in step S13, the alarmed status is reported to the software. Further, the alarm signal is supplied to the output control unit 124 being the buffer circuit. Since the output control unit 124 is in a turned-on state due to the switching system control signal, the alarm signal is loaded and output to the output unit 125 in step S14. Because the output unit 125 is also in a turned-on state by the switching system control signal, the output unit 125 outputs the alarm signal in step S15.

Thereafter, the control unit 110, which had previously been the ACT system, changes to the STBY system, and the output of the alarm is disabled in step S16. Further, the control unit 120 which had previously been the STBY system changes to the ACT system upon completing the setup for functioning as an ACT system, and starts outputting the alarm based on software control in step S17.

Figure 7:
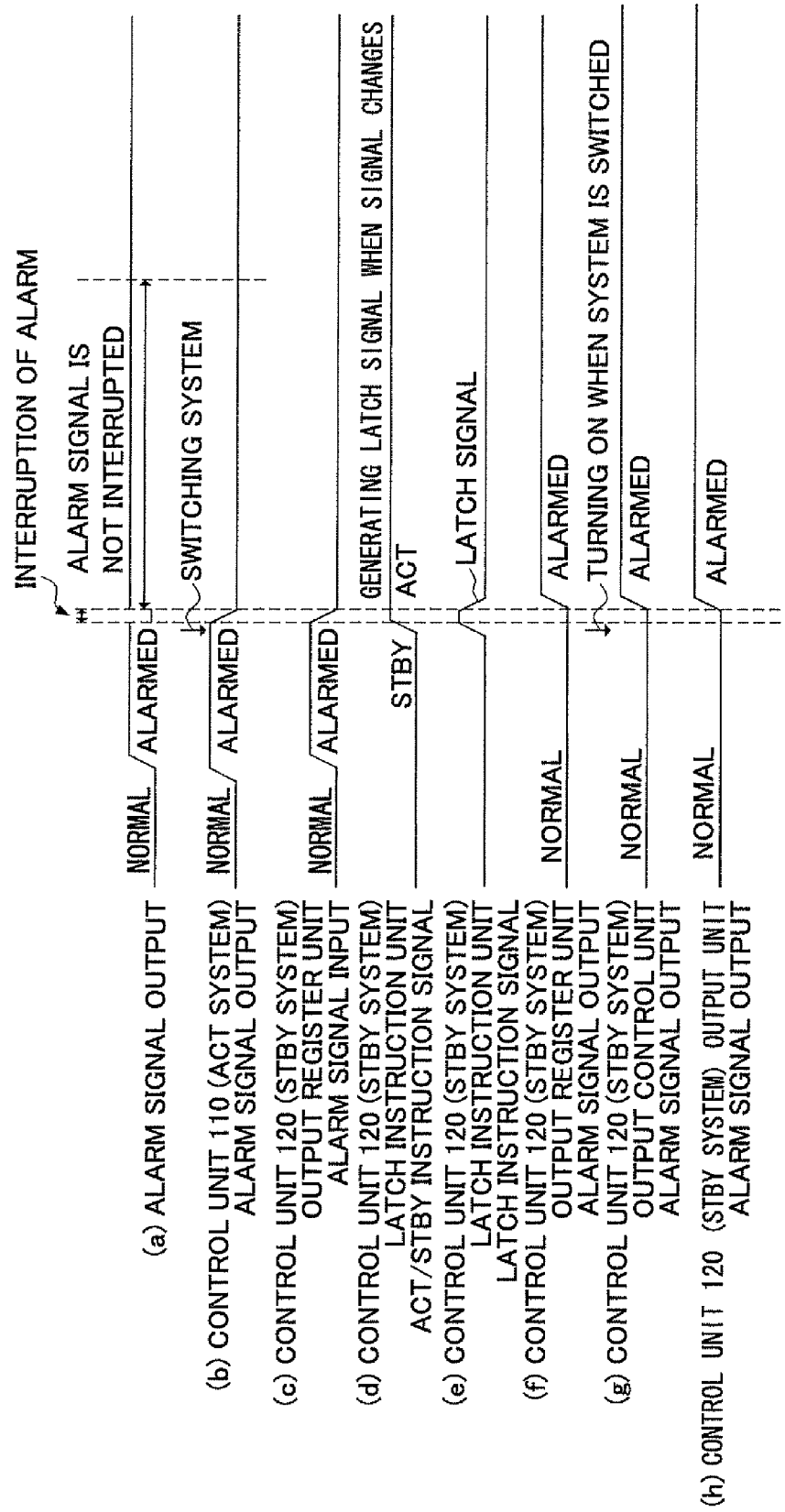
FIG. 7 is a timing chart of alarm signal outputs in Embodiment 1.

FIG. 7 illustrates alarm signals in various portions at a time of the switching. Reference characters (a), (b), (c), (d), (e), (f), (g), and (h) in FIG. 7 correspond to reference characters (a), (b), (c), (d), (e), (f), (g), and (h) in FIG. 5, respectively.

When a failure of the transmission device is detected by the control unit 110, as illustrated in a timing chart (b) of FIG. 7, an alarm signal is output from the control unit of the ACT system. At this time, in reference to (c) of FIG. 7, the alarm signal output from the control unit 110 of the ACT system reaches the output register unit 161 via the selecting unit 126 and the input unit 127 of the control unit 120 of the STBY system.

The switching system control signal is input into the latch instruction unit 162 when an event leading to switching the system occurs as in (d) of FIG. 7. The latch instruction unit 162 detects a change of the signal illustrated in (d) of FIG. 7, and supplies a pulse as a latch instruction signal to the output register unit 161 as illustrated in (e) of FIG. 7. The output register unit 161 loads the alarm signal upon receipt of the above pulse of the latch instruction signal and outputs the alarm signal as illustrated in (f) of FIG. 7. Because the output control unit 124 is turned on upon receipt of the switching system control signal, the alarm signal output from the output register unit 161 is loaded into the output control unit 124 and output from the output control unit 124 as illustrated in (g) of FIG. 7. The output unit 125 outputs the alarm signal in a similar manner as illustrated in (h) of FIG. 7.

As a result of these operations, the alarm signal output to the outside becomes (a) of FIG. 7 because a signal obtained by adding the signal (b) to the signal (h) is output as the signal (a). Before the switching system control signal is generated, the alarm signal is output from the control unit 110 as in (a) of FIG. 7. On and after the switching system control signal is generated, the alarm signal is output from the control unit 120 except for a brief period of the latch instruction without waiting for the activation of the software of the control unit 120. The problem of an alarm signal being nonexistent during activation of software is thus solved. However, as described above, the alarm signal is interrupted during the latch instruction period.

Figure 8:
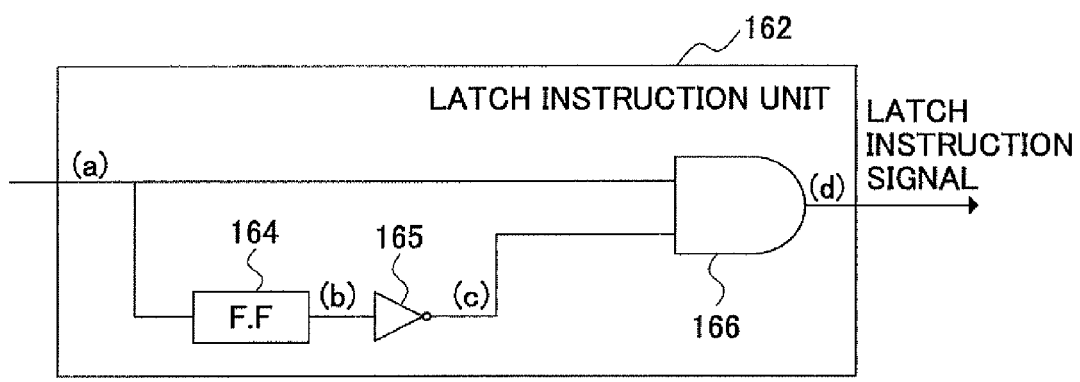
FIG. 8 illustrates an example of a circuit structure of a latch instruction unit.

The latch instruction unit 162 of Embodiment 1 may have any circuit structure as long as a pulse (e) in FIG. 7 is output upon detection of the switching system control signal, which is a rising edge of an ACT/STBY instruction signal (d) in FIG. 7. FIG. 8 illustrates an example of the circuit structure of the latch instruction unit 162. The latch instruction unit 162 includes a data retention circuit 164, a NOT circuit 165, and an AND circuit 166. In the example illustrated in FIG. 8, a flip-flop is used as the data retention circuit 164. Referring to a timing chart of FIG. 9, an operation of the latch instruction unit 162 will be described.

Figure 9:
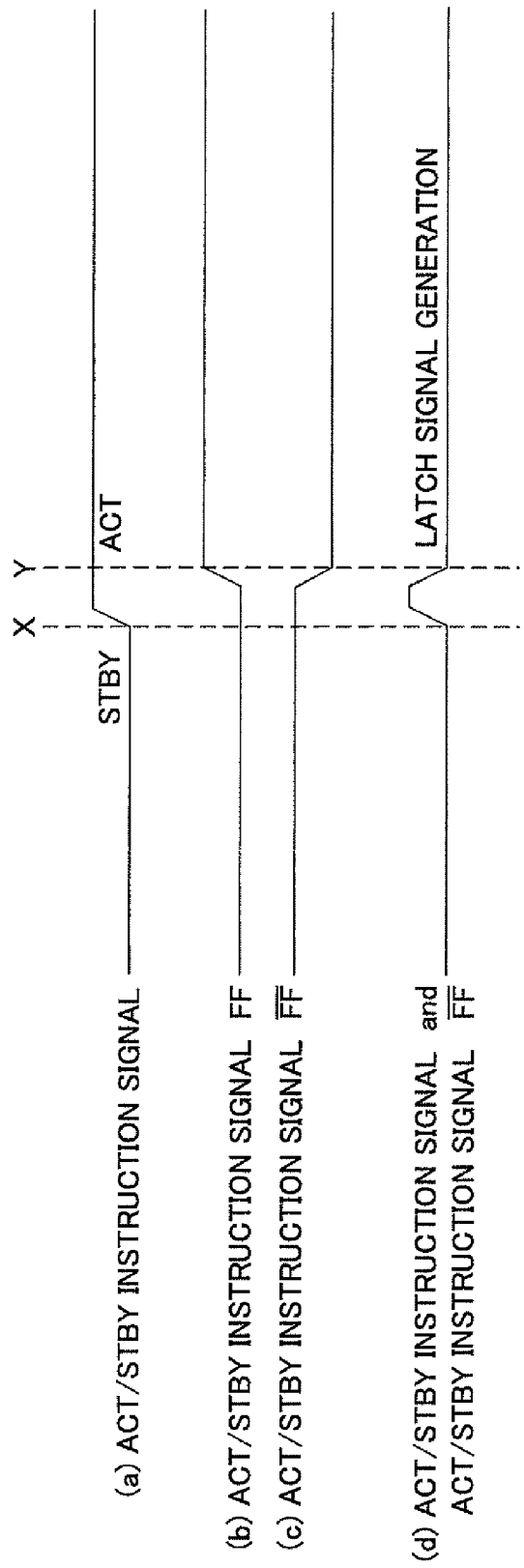
FIG. 9 is a timing chart illustrating operation of a latch instruction unit.

When the switching system control signal is input to the latch instruction unit 164, the ACT instruction signal is retained in the data retention circuit 164 and output from the data retention circuit 164 after a predetermined time as in (b) of FIG. 9. Further, the output signal from the data retention circuit 164 is inverted by the NOT circuit 165 and input to the AND circuit 166 as illustrated in (c) of FIG. 9. The signal (c) of FIG. 9 and the input signal (a) of FIG. 9 are input to the AND circuit 166, and the pulse (d) is output in a period of X through Y of FIG. 9.

Embodiment 2

Figure 10:
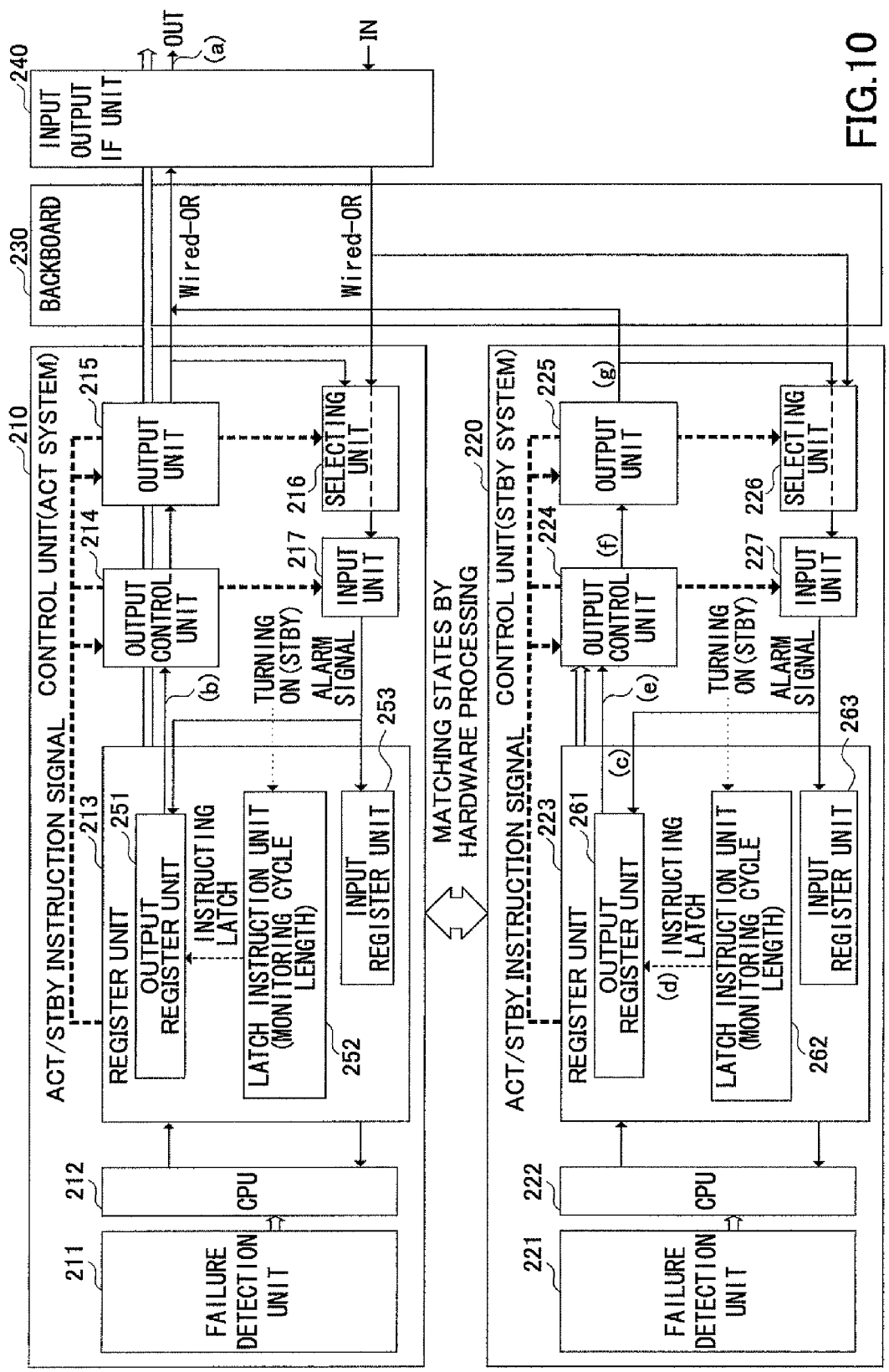
FIG. 10 illustrates a structure of control units of Embodiment 2.

In the following, Embodiment 2 will be described. FIG. 10 illustrates a structure of control units 210 and 220 of Embodiment 2. The control units 210 and 220 of Embodiment 2 have structures different from the control units 110 and 120. Latch instruction units 252 and 262 of the control units 210 and 220 are respectively different from the latch instruction units 152 and 162 of the control units 110 and 120 of Embodiment 1. The other portions are the same as those in Embodiment 1.

The latch instruction unit 262 of Embodiment 2 periodically outputs a pulse as a latch instruction signal to the output register unit 261. With this arrangement, the latch instruction unit 262 sends the latch instruction signal to the output register unit 261 without waiting for receipt of a switching system control signal.

Figure 11:
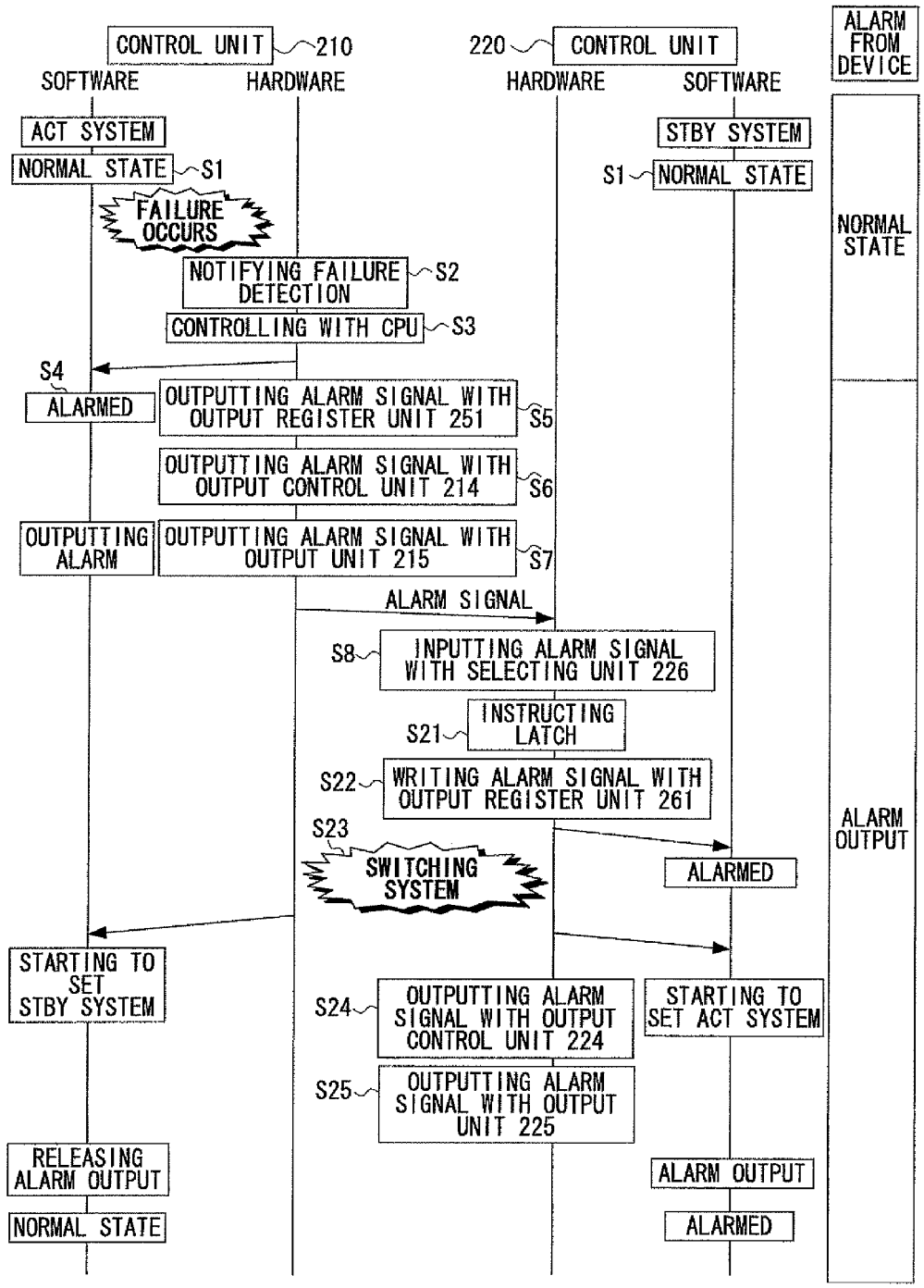
FIG. 11 is a sequence chart illustrating alarm output operations from control units at a time of switching between the ACT system and the STBY system.

Referring to a sequence chart of FIG. 11, a description will be given of an alarm output operation of the control units 210 and 220 in a case where the ACT system and the STBY system are switched over, with a main focus on a difference from Embodiment 1 in the alarm output operation.

The steps S1 through S8 of Embodiment 2 are the same as those of Embodiment 1. In step S8, the alarm signal from the control unit 210 of the ACT system reaches an output register unit 261 via a selection unit 226 and an input unit 227. Because the latch instruction unit 262 is designed to periodically produce the latch instruction signal, the latch instruction unit 262 supplies the latch instruction signal to the output register unit 261 in step S21 without waiting for a system switching control signal. The output register unit 261 loads the alarm signal and outputs the alarm signal in step S22. The alarm signal output from the output register unit 261 is supplied to an output control unit 224. Because the switching system control signal is not yet generated, the output control unit 224 is in a turned-off state, and, thus, does not output the alarm signal.

When the switching system control signal is provided in step S23, the output control unit 224 is turned on and outputs the alarm signal in step S24. Further, because the output unit 225 is turned on, the output unit 225 outputs the alarm signal in step S25.

Figure 12:
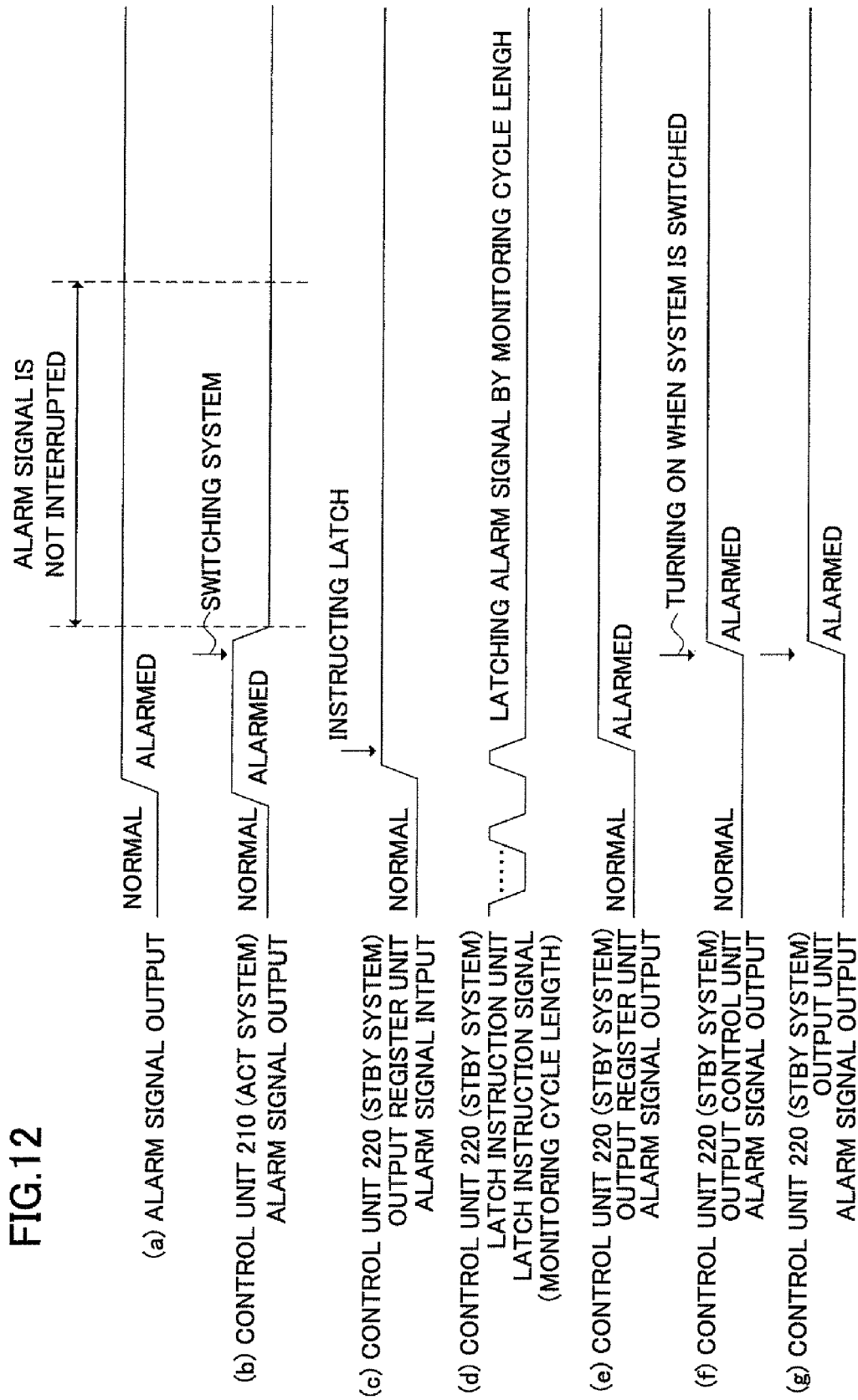
FIG. 12 is a timing chart of alarm signal outputs in Embodiment 2.

Referring to FIG. 12, statuses of the alarm signals in various portions at a time of switching the system are described. Reference characters (a), (b), (c), (d), (e), (f), and (g) in FIG. 12 correspond to reference characters (a), (b), (c), (d), (e), (f), and (g) in FIG. 10, respectively.

When a failure of the transmission device is detected by the control unit 210 of the ACT system, as in a timing chart of FIG. 12, an alarm signal (b) is output from the control unit 210 of the ACT system. At this time, in (c) of FIG. 12, the alarm signal output from the control unit 210 reaches the output register unit 261 via the selecting unit 226 and the input unit 227 of the control unit 220 of the STBY system.

As in (d) of FIG. 12, the latch instruction unit 262 periodically produces the latch instruction signal. Then, the alarm signal is loaded into the output register unit 261 by a first latch instruction signal after the alarm signal is inputted to the output register unit 261, and the alarm signal is output as in (e) of FIG. 12. However, since the output control unit 224 is in a turned-off state, the alarm signal is not output from the output control unit 224 when the alarm signal is started to output from the output register unit 261 as in (f) of FIG. 12.

Thereafter, when the switching system control signal is provided, the control unit 210 of the ACT system stops outputting the alarm signal (b) of FIG. 12. Because the output control unit 224 is turned on by the switching system control signal, the alarm signal is output from the output control unit 224 in (f) of FIG. 12. In a similar manner, the alarm signal is output from the output unit 225 in (g) of FIG. 12.

As a result of these operations, the alarm signal output to the outside becomes (a) of FIG. 12 because a signal obtained by adding the signal (b) to the signal (g) is output as the signal (a). Since the alarm signal is loaded into the output register unit 261 without waiting for the switching system control signal, the alarm signal is output from the output control unit 224 immediately after the switching system control signal is provided. Therefore, as in (a) of FIG. 12, the alarm signal is output to the outside without the interruption caused by the loading of the alarm signal as in Embodiment 1. Further, since the latch instruction signal is supplied multiple times, the alarm signal is loaded without a failure. The latch instruction unit 262 of Embodiment 2 may be realized by a counter circuit or the like.

Embodiment 3

Figure 13:
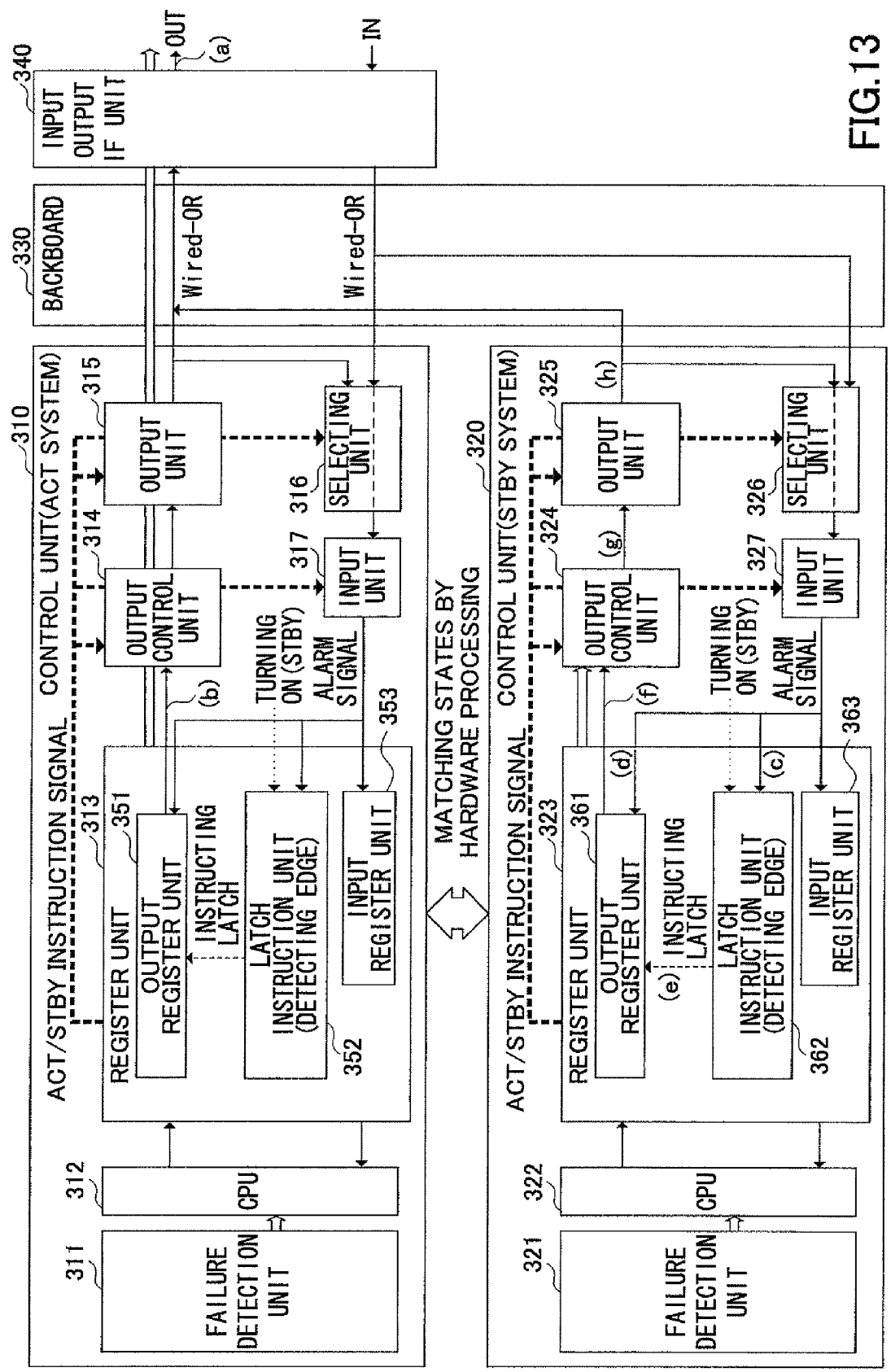
FIG. 13 illustrates a structure of control units of Embodiment 3.

Next, Embodiment 3 is described. FIG. 13 illustrates a structure of control units 310 and 320 of Embodiment 3. The control units 310 and 320 have the same structure. The control units 310 and 320 of Embodiment 3 have structures different from the control units 110 and 120 in Embodiment 1. Latch instruction units 352 and 362 of the control units 310 and 320 are respectively different from the latch instruction units 152 and 162 of the control units 110 and 120 of Embodiment 1. Embodiment 3 is different from Embodiment 1 in that an alarm signal output from the control unit 310 of the ACT system is input in the latch instruction unit 362. The control unit 310 has a structure similar to that of the control unit 320. The other portions are similar to those in Embodiment 1.

The latch instruction unit 362 of Embodiment 3 sends a latch instruction signal to an output register unit 361 in response to detection of an input of the alarm signal without waiting for a switching system control signal. When the latch instruction unit 362 detects the alarm signal, the alarm signal is input to the output register unit 361. Therefore, the output register unit 361 may take in and output the alarm signal upon receipt of the latch instruction signal from the latch instruction unit 362.

Figure 14:
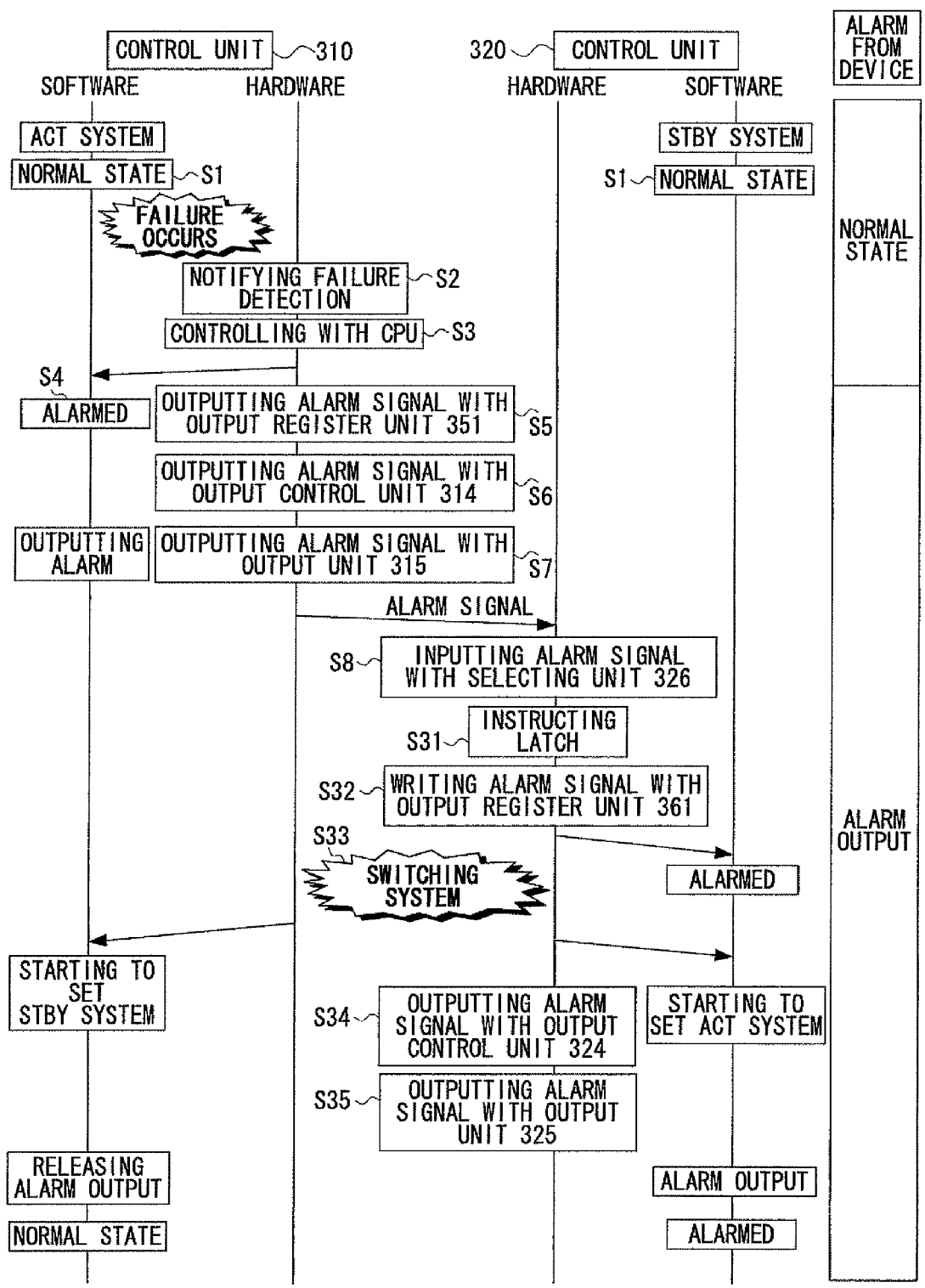
FIG. 14 is a sequence chart illustrating alarm output operations from control units at a time of switching between the ACT system and the STBY system.

Referring to a sequence chart of FIG. 14, there is described an alarm output operation of the control units 310 and 320 in a case where the ACT system and the STBY system are switched over, and mainly a difference from Embodiment 1 in the alarm output operation.

After detecting a failure with the control unit 310 of the ACT system, the alarm signal output from the control unit 310 of the ACT system reaches the latch instruction unit 362 and the output register unit 361 via a selecting unit 326 and an input unit 327. The latch instruction unit 362 outputs the latch instruction signal to the output register unit 361 in response to detection of an edge of the alarm signal in step S31. The output register unit 361 takes in the alarm signal in step S32. The alarm signal is output from the output register unit 361 to an output control unit 324. Because the switching system control signal is not yet generated, the output control unit 324 is turned off and the alarm signal is not output.

Thereafter, when the switching system control signal is provided in step S33, the output control unit 324 is turned on and outputs the alarm signal in step S34. Then, because an output unit 325 is turned on, the output unit 325 outputs the alarm signal in step S35.

Figure 15:
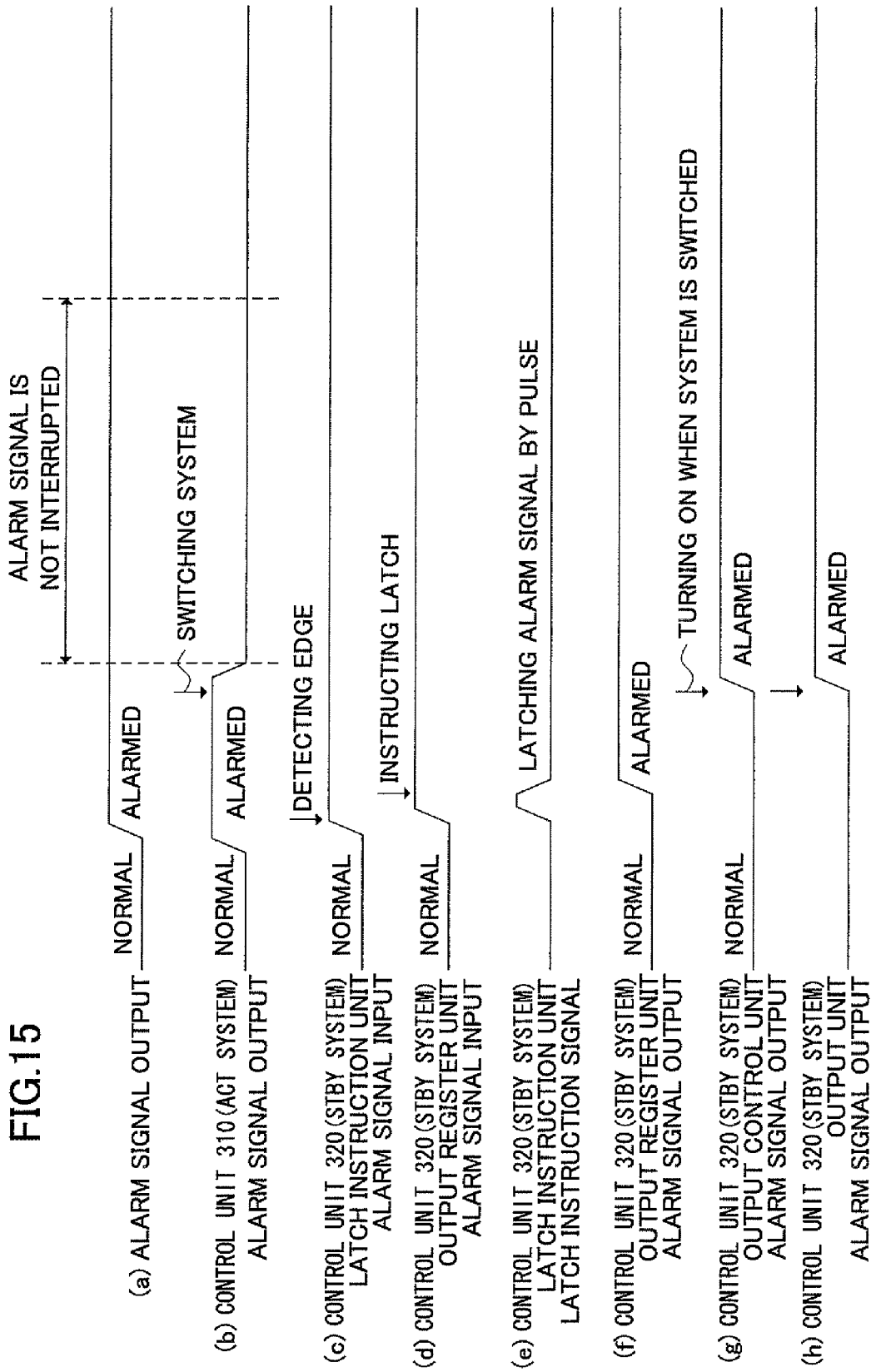
FIG. 15 is a timing chart of alarm signal outputs in Embodiment 3.

Referring to FIG. 15, statuses of the alarm signals in various portions at a time of switching over the system are described. Reference characters (a), (b), (c), (d), (e), (f), (g), and (h) in FIG. 15 correspond to reference characters (a), (b), (c), (d), (e), (f), (g), and (h) in FIG. 13, respectively.

When a failure is detected from a transmission device with the control unit 310 of the ACT system, as illustrated in a timing chart of FIG. 15, an alarm signal (b) is output from the control unit 310 of the ACT system. At this time, the alarm signal output from the control unit 310 reaches the latch instruction unit 362 and the output register unit 361 via the selecting unit 326 and the input unit 327 of the control unit 320 of the STBY system in (c) and (d), respectively, of FIG. 15.

The latch instruction unit 362 detects the alarm signal by detecting an edge of the alarm signal (c) of FIG. 15, and outputs the latch instruction signal in response to the detection in (c) of FIG. 15. As in (f) of FIG. 15, the output register unit 362 receiving the latch instruction signal takes in and outputs the alarm signal. However, since the output control unit 324 is turned off, the alarm signal is not output from the output control unit 324 when the output register unit 361 takes in the alarm signal (g) of FIG. 15.

Thereafter, when the switching system control signal is provided, the control unit 310 of the ACT system stops to output the alarm signal (b) of FIG. 15. Because the output control unit 324 is turned on by the switching system control signal, the alarm signal is output from the output control unit 324 in (g) of FIG. 15. In a similar manner, the alarm signal is output from the output unit 325 in (h) of FIG. 15.

As a result of these operations, the alarm signal output to the outside becomes (a) of FIG. 15 because a signal obtained by adding the signal (b) to the signal (h) is output as the signal (a). Since the alarm signal is already taken in the output register unit 361, the alarm signal may be output from the output control unit 324 immediately after the switching system control signal is provided. As in (a) of FIG. 15, the alarm signal may be output without interruption caused during taking in the alarm signal. The latch instruction unit 362 of Embodiment 3 can be realized by a differentiating circuit or the like.

Embodiment 4

Figure 16:
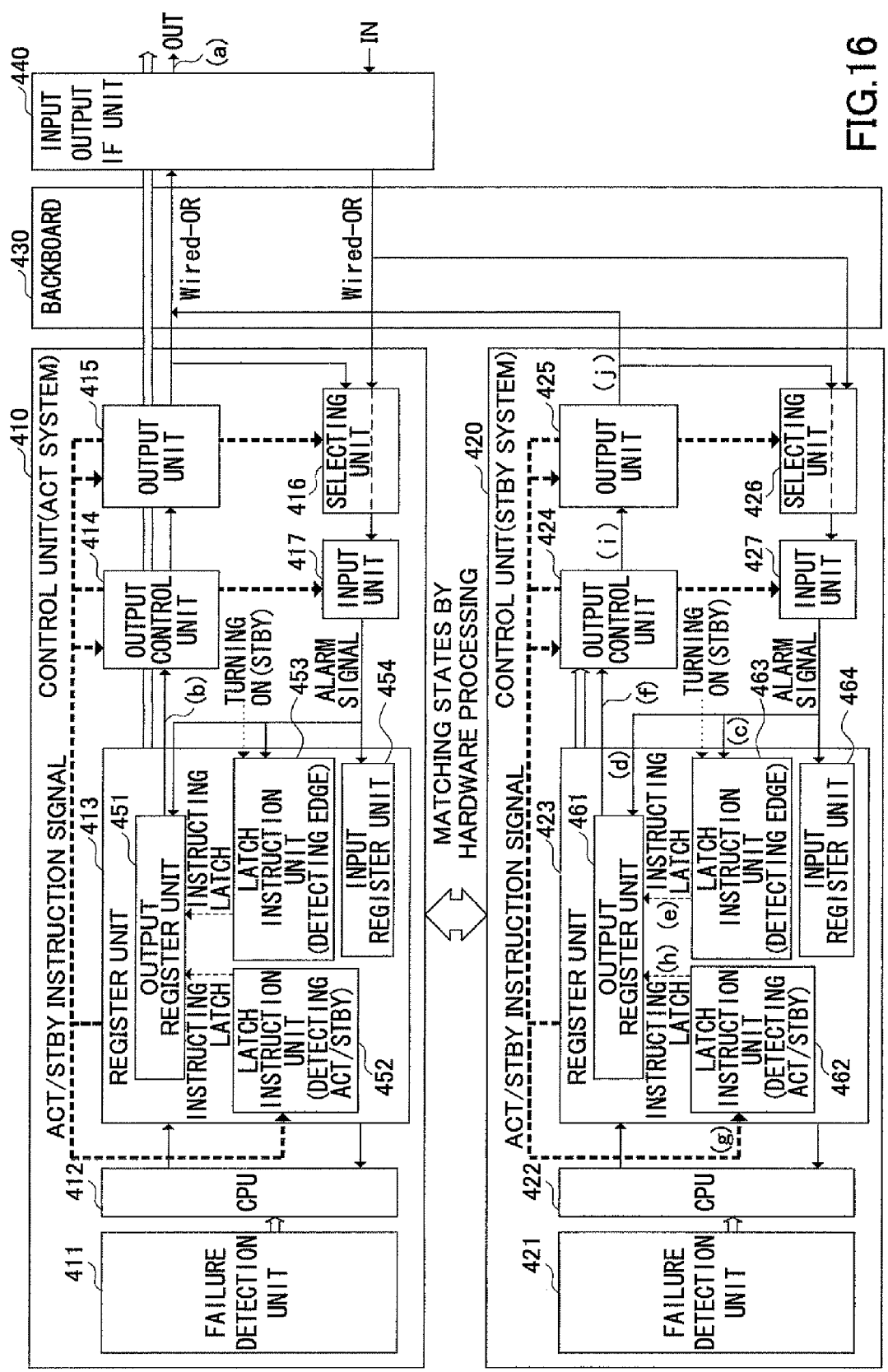
FIG. 16 illustrates a structure of control units of Embodiment 4.

Next, Embodiment 4 is described. FIG. 16 illustrates a structure of control units 410 and 420 of Embodiment 4. The control units 410 and 420 have the same structure. The control units 410 and 420 of the Embodiment 4 have latch instruction units 452 and 462 having the functions the same as the latch instruction units 152 and 162 of Embodiment 1 and latch instruction units 453 and 463 having the functions the same as the latch instruction units 352 and 362 of Embodiment 3, respectively. In a manner similar to Embodiment 3, an alarm signal output from the control unit 410 of the ACT system is input in the latch instruction unit 463.

Referring to a sequence chart of FIG. 17, there is described an alarm output operation of the control units 410 and 420 in a case where the ACT system and the STBY system are switched over, and mainly a difference from Embodiment 1 in the alarm output operation.

In step S8, the alarm signal from the control unit 410 of the ACT system reaches the latch instruction unit 463 and an output register unit 461 via a selection unit 426 and an input unit 427. The latch instruction unit 463 outputs a latch instruction signal to the output register unit 461 in response to detection of an edge of the alarm signal in step S41. The output register unit 461 takes in and outputs the alarm signal in step S42. The alarm signal is output from the output register unit 461 to an output control unit 424. Because a switching system control signal is not yet generated, the output control unit 424 is turned off and the alarm signal is not output.

Thereafter, when the switching system control signal is provided, the latch instruction unit 462 outputs the latch instruction signal to the output register unit 461 in step S44. In step S45, the output register unit 461 overwrites the alarm signal with an alarm signal which has already been taken in.

Since the output control unit 424 is already turned on by the switching system control signal, the output control unit 424 outputs the alarm signal in step S46. Then, because the output unit 425 is turned on, an output unit 425 outputs the alarm signal in step S47.

FIG. 18 illustrates alarm signals in various portions at a time of the switching-over.

Reference characters (a), (b), (c), (d), (e), (f), (g), (h), (i), and (j) in FIG. 18 correspond to reference characters (a), (b), (c), (d), (e), (f), (g), (h), (i), and (j) in FIG. 16, respectively.

When a failure of a transmission device is detected by the control unit 410 of the ACT system, as illustrated in a timing chart of FIG. 18, an alarm signal (b) is output from the control unit 410 of the ACT system. At this time, the alarm signal output from the control unit 410 reaches the latch instruction unit 463 and the output register unit 461 via the selecting unit 426 and the input unit 427 of the control unit 420 of the STBY system in (c) and (d), respectively, of FIG. 18.

The latch instruction unit 463 detects the alarm signal by detecting an edge of the alarm signal (c) of FIG. 18 and outputs the latch instruction signal in response to the detection in (e) of FIG. 18. As illustrated in (f) of FIG. 18, the output register unit 461 receiving the latch instruction signal takes in and outputs the alarm signal. However, because the output control unit 424 is turned off, the alarm signal is not output from the output control unit 424 at this time, as in (i) of FIG. 18.

When there occurs an event leading to switching the system and the switching system control signal is provided, the switching system control signal is input in the latch instruction unit 462 is as in (g) of FIG. 18. The latch instruction unit 462 detects a change of the signal (g) of FIG. 18, and outputs a pulse as a latch instruction signal to the output register unit 461 as in (h) of FIG. 18. The output register unit 461 takes in the alarm signal. However, because the alarm signal is already taken in, the output register unit 461 overwrites the alarm signal. Because the output control unit 424 is turned on upon receipt of the switching system control signal, the alarm signal output from the output register unit 461 is taken in the output control unit 424 and output from the output control unit 424 as in (i) of FIG. 18. The output unit 425 outputs the alarm signal in a similar manner as in (j) of FIG. 18.

As a result of these operations, the alarm signal output to the outside becomes (a) of FIG. 18 because a signal obtained by adding the signal (b) to the signal (j) is output as the signal (a). As in (a) of FIG. 18, the alarm signal may be output without being interrupted.

Embodiment 4 includes a combination of the latch instruction unit 452 being the same as the latch instruction unit 152 of Embodiment 1 and the latch instruction unit 453 being the same as the latch instruction unit 352 of Embodiment 3, and a combination of the latch instruction unit 462 being the same as the latch instruction unit 162 of Embodiment 1 and the latch instruction unit 463 being the same as the latch instruction unit 362 of Embodiment 3. However, it is also possible to combine the latch instruction unit 452 being the same as the latch instruction unit 152 of Embodiment 1 and the latch instruction unit 453 being the same as the latch instruction unit 252 of Embodiment 2, and to combine the latch instruction unit 462 being the same as the latch instruction unit 162 of Embodiment 1 and the latch instruction unit 463 being the same as the latch instruction unit 262 of Embodiment 2.

According to Embodiment 4, even though it is failed to take in the alarm signal in the output register unit 461, the alarm signal is taken in again when there occurs the event leading to switching the system. Therefore, the alarm signal may be output without an interruption caused by activation of software. Further, even though any signal different from an alarm signal is taken in, the alarm signal is taken in again when there occurs the event leading to switching the system. Therefore, the alarm signal may be output without interruption. Furthermore, even if it fails to take in the alarm signal when there occurs the event leading to switching the system, the alarm signal may be output when there occurs the event leading to switching the system because the alarm signal is taken in before there occurs the event leading to switching the system. Therefore, the structure of Embodiment 4 enables to more surely output the alarm signal without interruption.

Embodiments 1 through 4 are provided to prevent outputs of alarm signals from being interrupted when a system is switched over in a monitoring device having a redundant configuration such as fault tolerance.

With Embodiments 1 through 4, when a monitoring device is in a standby state, an alarm signal output from another monitoring device is obtained by the monitoring device and the monitoring device stores the alarm signal in an alarm signal storing unit. Therefore, in a case where a system is switched over, the alarm signal may be immediately received from an output unit without waiting for activation of software. Therefore, interruption of the alarm signal may be prevented when the system is switched over.

Specifically, although Embodiments 1 through 4 exemplify a transmission device, the present invention is applicable to any information processing device including a monitoring device and employing a redundant configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring device configured to be installed in an information processing apparatus to detect a failure of the information processing apparatus, and to output an alarm signal when the failure is detected, the monitoring device comprising:
   an alarm signal generating unit that generates the alarm signal upon detecting the failure;
   an alarm signal storing unit that stores the generated alarm signal;
   an alarm signal output unit that outputs the stored alarm signal to outside;
   an alarm signal input unit that receives, when the monitoring device is in a standby state, another alarm signal from another monitoring device in an active state; and
   an alarm signal storage instructing unit that supplies to the alarm signal storing unit an instruction signal for storing said another alarm signal in the alarm signal storing unit.

2. The monitoring device according to claim 1, wherein the alarm signal storage instructing unit supplies the instruction signal to the alarm signal storing unit in response to detection of a switching signal for switching the monitoring device from the standby state to the active state.

3. The monitoring device according to claim 1, wherein the alarm signal storage instructing unit periodically supplies the instruction signal to the alarm signal storing unit.

4. The monitoring device according to claim 1, wherein the alarm signal storage instructing unit supplies the instruction signal to the alarm signal storing unit in response to detection of an input of said another alarm signal.

5. An information processing apparatus comprising plural monitoring devices which is either in a standby state or in an active state,
   wherein a given one of the plural monitoring devices comprises:
   an alarm signal generating unit that generates an alarm signal upon detecting a failure;
   an alarm signal storing unit that stores the generated alarm signal;
   an alarm signal output unit that outputs the stored alarm signal to outside;
   an alarm signal input unit that receives another alarm signal from another one of the plural monitoring devices, said another one being in the active state, when said given one of the plural monitoring devices is in the standby state; and an alarm signal storage instructing unit that supplies to the alarm signal storing unit an instruction signal for storing the other alarm signal in the alarm signal storing unit.

6. The information processing apparatus according to claim 5, further comprising:
an interface unit; and
a switch unit,
wherein the information processing apparatus is a communication device.

7. An alarm signal outputting method in an information processing apparatus including plural monitoring devices which is either in a standby state or in an active state, the alarm signal outputting method comprising:
detecting a failure of the information processing apparatus with a first monitoring device in the active state, the first monitoring device being one of the plural monitoring devices;
generating an alarm signal with the first monitoring device in response to detection of the failure by the first monitoring device in the active state;
outputting the alarm signal to outside with the first monitoring device in the active state;
inputting the alarm signal, which is output from the first monitoring device, with a second monitoring device in the standby state, the second monitoring device being another one of the plural monitoring devices;
supplying to an alarm signal storing unit of the second monitoring device an instruction signal for making the alarm signal storing unit store the alarm signal with the second monitoring device;
storing the alarm signal, which is input by the second monitoring device, with the alarm signal storing unit in response to the instruction signal; and
outputting the alarm signal, which is stored in the alarm signal storing unit, to the outside upon detection of, by the second monitoring device, a control signal for switching the second monitoring device from the standby state to the active state.

8. The alarm signal outputting method according to claim 7, wherein the instruction signal is supplied to the alarm signal storing unit with the second monitoring device in response to detection of the control signal by the second monitoring device.

9. The alarm signal outputting method according to claim 7, wherein the second monitoring device periodically supplies the instruction signal to the alarm signal storing unit.

10. The alarm signal outputting method according to claim 7, wherein the second monitoring device supplies the instruction signal to the alarm signal storing unit in response to detection of the input of the alarm signal by the second monitoring device.

* * * * *